(12) United States Patent
Somers et al.

(10) Patent No.: US 6,718,474 B1
(45) Date of Patent: Apr. 6, 2004

(54) METHODS AND APPARATUS FOR CLOCK MANAGEMENT BASED ON ENVIRONMENTAL CONDITIONS

(75) Inventors: Jeffrey Somers, Northboro, MA (US); Kurt Thaller, Acton, MA (US); Nicholas Warchol, Boxboro, MA (US)

(73) Assignee: Stratus Technologies Bermuda LTD., Hamilton (BM)

(*) Notice: Subject to any disclaimer, the term of this patent is extended or adjusted under 35 U.S.C. 154(b) by 549 days.

(21) Appl. No.: 09/666,254

(22) Filed: Sep. 21, 2000

(51) Int. Cl.[7] .............................. G06F 1/32; G06F 1/06
(52) U.S. Cl. ....................... 713/322; 713/501; 713/601
(58) Field of Search ................................ 713/320, 322, 713/500, 501, 601; 709/248, 400

(56) References Cited

U.S. PATENT DOCUMENTS

| | | | |
|---|---|---|---|
| 3,252,056 A | 5/1966 | Poesl | |
| 3,697,854 A | 10/1972 | Berger | 321/2 |
| 3,710,324 A | 2/1973 | Cohen et al. | 340/172.5 |
| 3,900,741 A | 8/1975 | Fletcher et al. | 307/204 |
| 4,015,246 A | 3/1977 | Hopkins, Jr. et al. | 340/172.5 |
| 4,019,143 A | 4/1977 | Fallon et al. | 328/71 |
| 4,025,874 A | 5/1977 | Abbey | 331/55 |
| 4,059,736 A | 11/1977 | Perucca et al. | 179/175.2 R |
| 4,144,448 A | 3/1979 | Pisciotta et al. | 235/301 |
| 4,156,200 A | 5/1979 | Gomez | 328/61 |
| 4,164,787 A | 8/1979 | Aranguren | 364/200 |
| 4,185,245 A | 1/1980 | Fellinger et al. | 328/103 |
| 4,228,496 A | 10/1980 | Katzman et al. | 364/200 |
| 4,236,197 A | 11/1980 | Shelly | 363/41 |
| 4,239,982 A | 12/1980 | Smith et al. | 307/219 |
| 4,253,139 A | 2/1981 | Weiss | 363/95 |
| 4,301,497 A | 11/1981 | Johari | 363/21 |
| 4,302,805 A | 11/1981 | Marez et al. | 363/91 |
| 4,322,580 A | 3/1982 | Khan et al. | 179/18 EE |
| 4,330,826 A | 5/1982 | Whiteside et al. | 364/200 |
| 4,344,121 A | 8/1982 | Weber | 363/16 |
| 4,356,550 A | 10/1982 | Katzman et al. | 364/200 |
| 4,366,535 A | 12/1982 | Cedolin et al. | 364/200 |
| 4,375,683 A | 3/1983 | Wensley | 371/36 |
| 4,425,612 A | 1/1984 | Bahler et al. | 363/21 |
| 4,439,821 A | 3/1984 | Grippe | 363/26 |
| 4,459,651 A | 7/1984 | Fenter | 363/21 |
| 4,480,198 A | 10/1984 | Gass | 307/269 |
| 4,503,490 A | 3/1985 | Thompson | 364/200 |
| 4,507,784 A | 3/1985 | Procter | 371/61 |
| 4,521,745 A | 6/1985 | Falconer | 331/2 |
| 4,538,272 A | 8/1985 | Edwards et al. | 371/61 |
| 4,580,243 A | 4/1986 | Renner et al. | 364/900 |
| 4,589,052 A | 5/1986 | Dougherty | 361/94 |
| 4,644,498 A | 2/1987 | Bedard et al. | 364/900 |
| 4,653,054 A | 3/1987 | Liu et al. | 371/61 |

(List continued on next page.)

FOREIGN PATENT DOCUMENTS

| | | | |
|---|---|---|---|
| DE | 2360450 | 5/1973 | |
| EP | 0074303 | 2/1986 | |
| EP | 0 596 657 A2 | 5/1994 | G06F/1/12 |
| EP | 0 845 735 A1 | 6/1998 | G06F/1/10 |
| GB | 2064893 A | 6/1981 | |

*Primary Examiner*—Thomas M. Heckler
(74) *Attorney, Agent, or Firm*—Testa, Hurwitz & Thibeault, LLP

(57) ABSTRACT

A method and apparatus for controlling processor clock rates of a synchronous multi-processor system in response to an environmental condition of a processor. In one embodiment, a processor-reported an environmental condition is stored in a register and all processors are interrupted simultaneously. Upon interrupt, each processor reads the contents of the register and responds by adjusting its local clock rate synchronously with the other processors. In another embodiment, the processor's environmental status is polled by software control. Upon notification of an environmental condition, the software control notifies each processor to adjust its local clock rate synchronously with the other processors.

23 Claims, 7 Drawing Sheets

U.S. PATENT DOCUMENTS

| | | | |
|---|---|---|---|
| 4,674,037 A | 6/1987 | Funabashi et al. | 364/200 |
| 4,686,677 A | 8/1987 | Flora | 371/61 |
| 4,691,126 A | 9/1987 | Splett et al. | 307/441 |
| 4,703,421 A | 10/1987 | Abrant et al. | 364/200 |
| 4,709,347 A | 11/1987 | Kirk | 364/900 |
| 4,777,575 A | 10/1988 | Yamato et al. | 363/21 |
| 4,800,564 A | 1/1989 | DeFazio et al. | 371/61 |
| 4,823,262 A | 4/1989 | Calle | 364/200 |
| 4,835,669 A | 5/1989 | Hancock et al. | 363/21 |
| 4,839,855 A | 6/1989 | Van Driel | 364/900 |
| 4,869,673 A | 9/1989 | Kreinberg et al. | 439/64 |
| 4,916,695 A | 4/1990 | Ossfeldt | 371/9.1 |
| 4,920,540 A | 4/1990 | Baty | 371/61 |
| 4,930,063 A | 5/1990 | Henze et al. | 363/91 |
| 4,935,642 A | 6/1990 | Obelode et al. | 307/32 |
| 4,984,241 A | 1/1991 | Truong | 371/36 |
| 5,020,024 A | 5/1991 | Williams | 364/900 |
| 5,036,221 A | 7/1991 | Brucculeri et al. | 307/443 |
| 5,070,430 A | 12/1991 | Meusel et al. | 361/407 |
| 5,155,840 A | 10/1992 | Niijima | 395/550 |
| 5,239,215 A | 8/1993 | Yamaguchi | 307/480 |
| 5,274,678 A | 12/1993 | Ferolito et al. | 375/108 |
| 5,285,345 A | 2/1994 | Blümel et al. | 361/98 |
| 5,291,528 A | 3/1994 | Vermeer | 375/106 |
| 5,390,081 A | 2/1995 | St. Pierre | 361/775 |
| 5,420,777 A | 5/1995 | Muto | 363/21 |
| 5,423,046 A | 6/1995 | Nunnelley et al. | 395/750 |
| 5,479,648 A | 12/1995 | Barbera et al. | 395/750 |
| 5,483,436 A | 1/1996 | Brown et al. | 363/98 |
| 5,539,606 A | 7/1996 | Covi et al. | 361/94 |
| 5,559,459 A | 9/1996 | Back et al. | 326/93 |
| 5,584,030 A | 12/1996 | Husak et al. | 395/750 |
| 5,600,784 A | 2/1997 | Bissett et al. | 395/182.1 |
| 5,627,717 A | 5/1997 | Pein et al. | 361/95 |
| 5,737,160 A | 4/1998 | Duffy | 361/3 |
| 5,754,037 A | 5/1998 | Ezell et al. | 323/273 |
| 5,757,631 A | 5/1998 | Semmler | 363/41 |
| 5,758,134 A | 5/1998 | Imel et al. | 395/556 |
| 5,809,256 A | 9/1998 | Najemy | 395/283 |
| 5,838,578 A | 11/1998 | Pippin | 364/488 |
| 5,854,742 A | 12/1998 | Faulk | 363/97 |
| 5,881,251 A | 3/1999 | Fung et al. | 395/283 |
| 5,907,467 A | 5/1999 | Barbour | 361/170 |
| 5,936,852 A | 8/1999 | Weinmeier et al. | 363/21 |
| 5,943,227 A | 8/1999 | Bryson et al. | 363/95 |
| 5,945,802 A | 8/1999 | Konrad et al. | 318/807 |
| 5,955,870 A | 9/1999 | Nair | 323/273 |
| 5,978,195 A | 11/1999 | Goder et al. | 361/94 |
| 5,982,645 A | 11/1999 | Levran et al. | 363/37 |
| 5,995,349 A | 11/1999 | Temple | 361/94 |
| 5,996,035 A | 11/1999 | Allen et al. | 710/103 |
| 5,996,084 A * | 11/1999 | Watts | 713/323 |
| 5,999,387 A | 12/1999 | Roesch et al. | 361/58 |
| 6,002,602 A | 12/1999 | Higuchi | 363/95 |
| 6,046,511 A | 4/2000 | Kincaid | 307/10.1 |
| 6,049,447 A | 4/2000 | Roesch et al. | 361/58 |
| 6,055,162 A | 4/2000 | Tarrillo et al. | 363/25 |
| 6,055,587 A | 4/2000 | Asami et al. | 710/49 |
| 6,062,480 A | 5/2000 | Evoy | 235/492 |
| 6,081,105 A | 6/2000 | Nair | 323/273 |
| 6,084,385 A | 7/2000 | Nair | 323/273 |
| 6,104,106 A | 8/2000 | Partridge | 307/126 |
| 6,108,183 A | 8/2000 | Beene | 361/93.8 |
| 6,125,417 A | 9/2000 | Bailis et al. | 710/103 |
| 6,510,400 B1 * | 1/2003 | Moriyama | 702/132 |

* cited by examiner

METHODS AND APPARATUS FOR CLOCK MANAGEMENT BASED ON ENVIRONMENTAL CONDITIONS

FIELD OF THE INVENTION

The present invention relates generally to controlling system clocks and specifically to controlling system clock rate in response to an environmental condition.

BACKGROUND OF THE INVENTION

Through increasingly larger die sizes and circuit miniaturization techniques, advances in integrated circuit (IC) fabrication have lead to the development of individual ICs housing millions of transistors. At the same time, these densely populated ICs are performing greater and greater numbers of operations per second. As a result, today's microprocessors operate at higher power levels producing heat that must be managed to prevent failures. External cooling devices can be used to dissipate heat. These devices include both passive devices, such as heat sinks, and active devices such as fans and thermoelectric coolers. More recent techniques include the incorporation of thermal sensors within ICs that monitor on-die temperature and provide control signals to an active cooling system. Other solutions include an ability to control IC temperature without the use of external cooling mechanisms. One solution incorporates a clock-throttling mechanism used to slow the processing speed of the IC in response to an over-temperature condition reported by the IC's thermal sensor. The reduction in processing speed reduces power consumption thereby reducing the amount of heat to be dissipated.

Fault-tolerant computing systems that use hardware redundancy may be constructed with multiple modules, such as central processing units (CPUs), operating in a synchronous, lock-step relationship (performing the same instructions on the same clock cycle). It is desirable for these systems to employ current-technology, enabling commodity ICs to reap the benefits of reduced size, increased performance and reduced cost. Being subject to the thermal conditions described above, it is desirable to utilize ICs with a thermal sensing capability in combination with a clock-throttling technique to manage the thermal load while preserving system reliability. However, allowing each processor within a fault-tolerant system to reduce its own clock rate as its temperature rose above a predetermined threshold would remove the ability of the processors to operate in lock step. This is because thermal gradients caused by ambient conditions would result in the on-die temperature of individual processors increasing above a common threshold at different times. This loss of synchronization would then result in system failures. The present invention avoids this problem.

SUMMARY OF THE INVENTION

The present invention relates to methods and apparatus for controlling central processing unit (CPU) power consumption in response to a reported environmental condition by varying the clock rate of each processor of a synchronous multi-processor system. The object of this invention is to maintain synchronization of all processors before, during, and after any clock-rate variation response to reported environmental conditions.

In accordance with one embodiment of the invention, a computer system employs two or more identical CPUs, each containing a microprocessor executing the same instructions at substantially the same time, according to the processor clock rate. Each microprocessor includes a thermal sensor that continuously monitors the on-die temperature and compares it to a pre-stored threshold value. In this embodiment, one feature of the invention is that when the measured on-die processor temperature crosses the threshold value, the microprocessor writes the result to a common, external interrupt register.

Another feature of the invention is the simultaneous interrupt notification to all CPUs of the multi-processor system of a reported over-temperature condition on any CPU. Upon interrupt notification, each microprocessor halts all applications and enters a service-handling routine where the contents of the interrupt register are read to determine the cause of the interrupt. Yet another feature of the invention is the simultaneous reduction of each processor clock rate to a lower rate in response to the reported over-temperature interrupt. In one embodiment, the microprocessor controls a local phase-locked loop (PLL) to reduce its local clock rate. When the microprocessor detects an over-temperature condition, it actuates a reduction of the local clock rate to a lower rate. Operation at the lower clock rate will reduce microprocessor power consumption resulting in an eventual reduction of the microprocessor's, on-die temperature.

In another embodiment, one feature of the invention is a software-controlled polling of each CPU to report any over-temperature conditions. In this embodiment, each microprocessor is in communication with a register having a bit, or multiple bits, that effects control of the processor clock rate. Other embodiments are envisioned where the register effecting control of the processor clock rate may be contained within the microprocessor. Another feature of the invention is to simultaneously set the clock rate reduction bit, or multiple bits, within each register.

BRIEF DESCRIPTION OF THE DRAWINGS

The invention is pointed out with particularity in the appended claims. The drawings are not necessarily to scale, emphasis instead generally being placed upon illustrating the principles of the invention. Like reference characters in the respective drawing figures indicate corresponding parts. The advantages of the invention described above, as well as further advantages of the invention, may be better understood by reference to the description taken in conjunction in the accompanying drawings, in which:

DETAILED DESCRIPTION OF THE INVENTION

Figure 1:
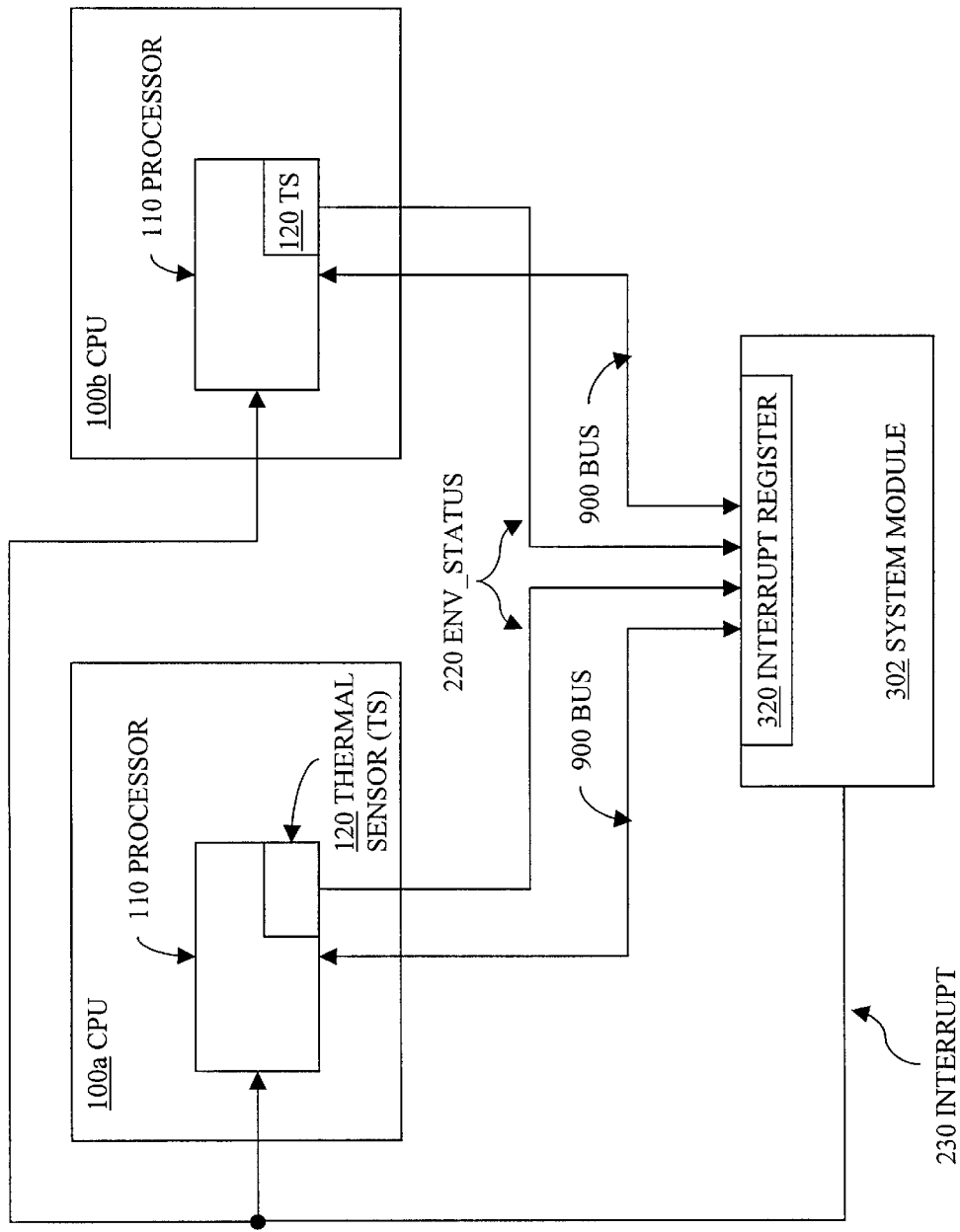
FIG. 1 is a system block diagram of an embodiment of a fault-tolerant computer system constructed in accordance with the present invention.

One embodiment of the present invention, shown in FIG. 1, is a fault-tolerant, synchronous, multi-processor system that alters the clock rate of each processor of the multiprocessor system in response to a measurement of an environmental condition in at least one processor of the multiprocessor system. In one embodiment, the environmental condition represents the on-die temperature. In other embodiments, the environmental condition represents Time of Day (TOD), electrical current, humidity, and barometric pressure.

An embodiment of a fault-tolerant computer includes a number of redundant Central Processing Units (CPU), 100a, 100b (generally 100), that are operating in a synchronous, lock step relationship, that is, performing the same operations at the same time. Each of the redundant CPUs 100 is in electrical communication with a bus 900 that is in electrical communication with a common external System Module (SM) 302.

Each redundant CPU 100 includes a processor 110. In one embodiment, each processor 110 is of a variety that includes an environmental sensor, such as a thermal sensor 120 that provides an output signal ENV_STATUS 220 in response to the measured environmental condition exceeding a predetermined threshold value in its respective processor. In one embodiment, the processor 110 is an Intel Pentium III® XEON™ processor and the environmental condition is its on-die temperature. Other embodiments are possible in which environmental condition-measuring circuitry external to the processor 110 determines that the environmental condition of the processor 110 exceeds a predefined threshold.

The ENV_STATUS 220 signal from each CPU 100, or environmental condition-measuring circuitry, is provided as an input to the SM 302 notifying the SM 302 that the environmental condition of a processor 110 has exceeded a predefined threshold. In one embodiment, the SM 302 includes an interrupt register 320. The interrupt register 320 stores the results ENV_STATUS 220. In response to an environmental condition exceeding a predefined threshold for any processor 110 being reported by ENV_STATUS 220, the SM 302 generates an interrupt 230 to all processors 110 simultaneously. In response to the interrupt, each of the processors 110 reads the contents of the interrupt register 320 to determine the cause of the interrupt.

Figure 2:
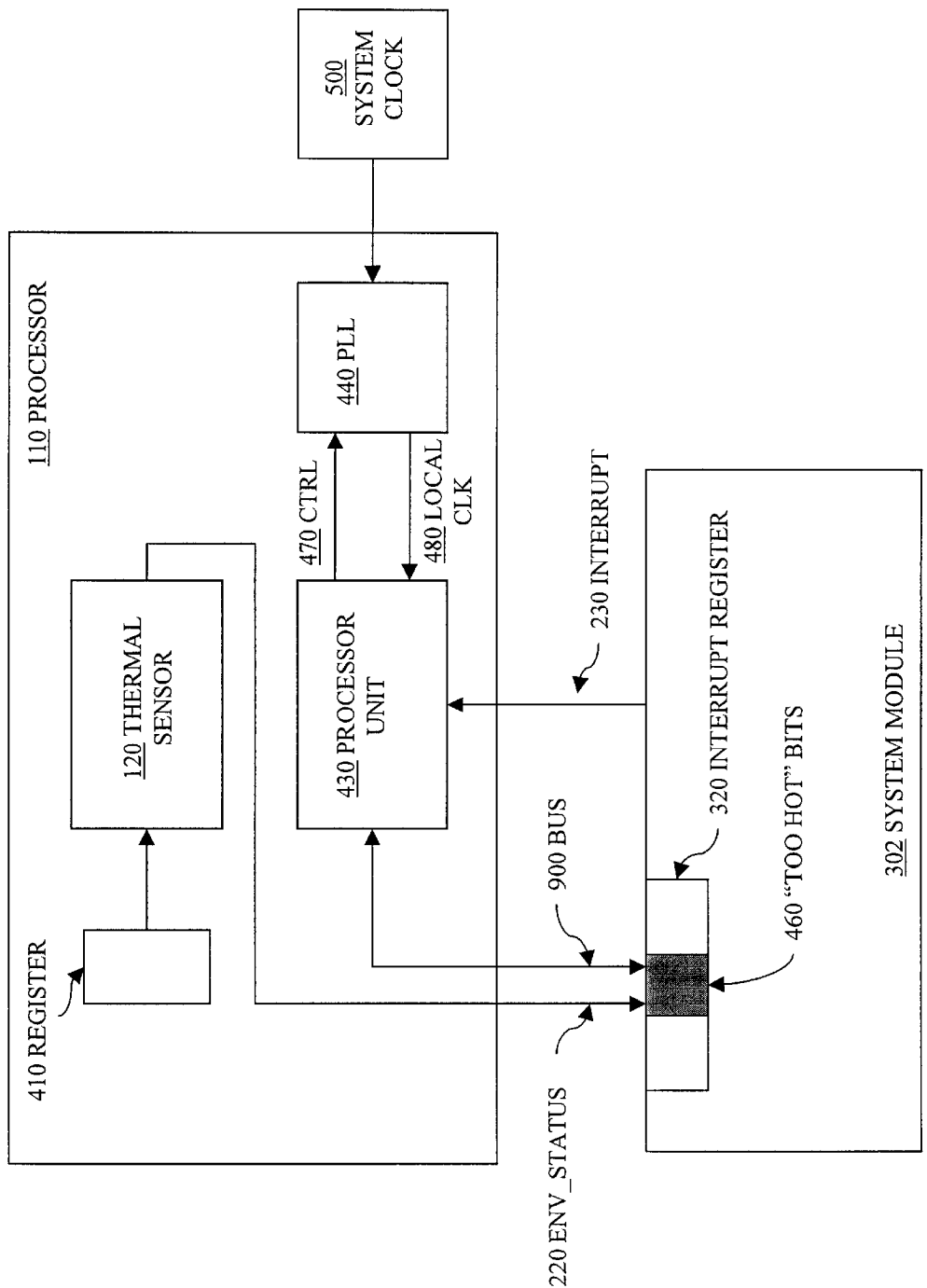
FIG. 2 is a more detailed block diagram of an embodiment of a fault-tolerant computer system shown FIG. 1.

Referring to FIG. 2, in one embodiment, each processor 110 contains a thermal sensor 120 that monitors the on-die temperature and a register 410 that holds a programmable threshold temperature. The thermal sensor 120 compares the measured on-die temperature with the threshold value stored in register 410 of processor 110 and provides an output signal ENV_STATUS 220 when the temperature crosses the threshold value. Results of this comparison for each processor 110 are similarly conveyed to the SM 302 and stored in interrupt register 320. In one embodiment, ENV_STATUS 220 indicates that the processor temperature measured by the thermal sensor 120 is equal to or greater than the threshold value stored in register 410. In response to such an over-temperature indication by ENV_STATUS 220, a value is written into a "too hot" bit 460, or series of bits, within interrupt register 320. In one embodiment, a single bit is used to indicate the presence or absence of an over-temperature condition. Whereas, in other embodiments, a series of bits are used indicating the presence or absence of an over-temperature condition, and locating the temperature condition within a predetermined range of temperatures. In response to the same over-temperature indication by ENV_STATUS 220, the SM 302 sends an interrupt 230 signal substantially simultaneously to all processors 110. Upon their servicing of an interrupt, the processors 110 read, through the electrical communications bus 900, the information stored in "too hot" bit(s) 460 of interrupt register 320.

Figure 3:
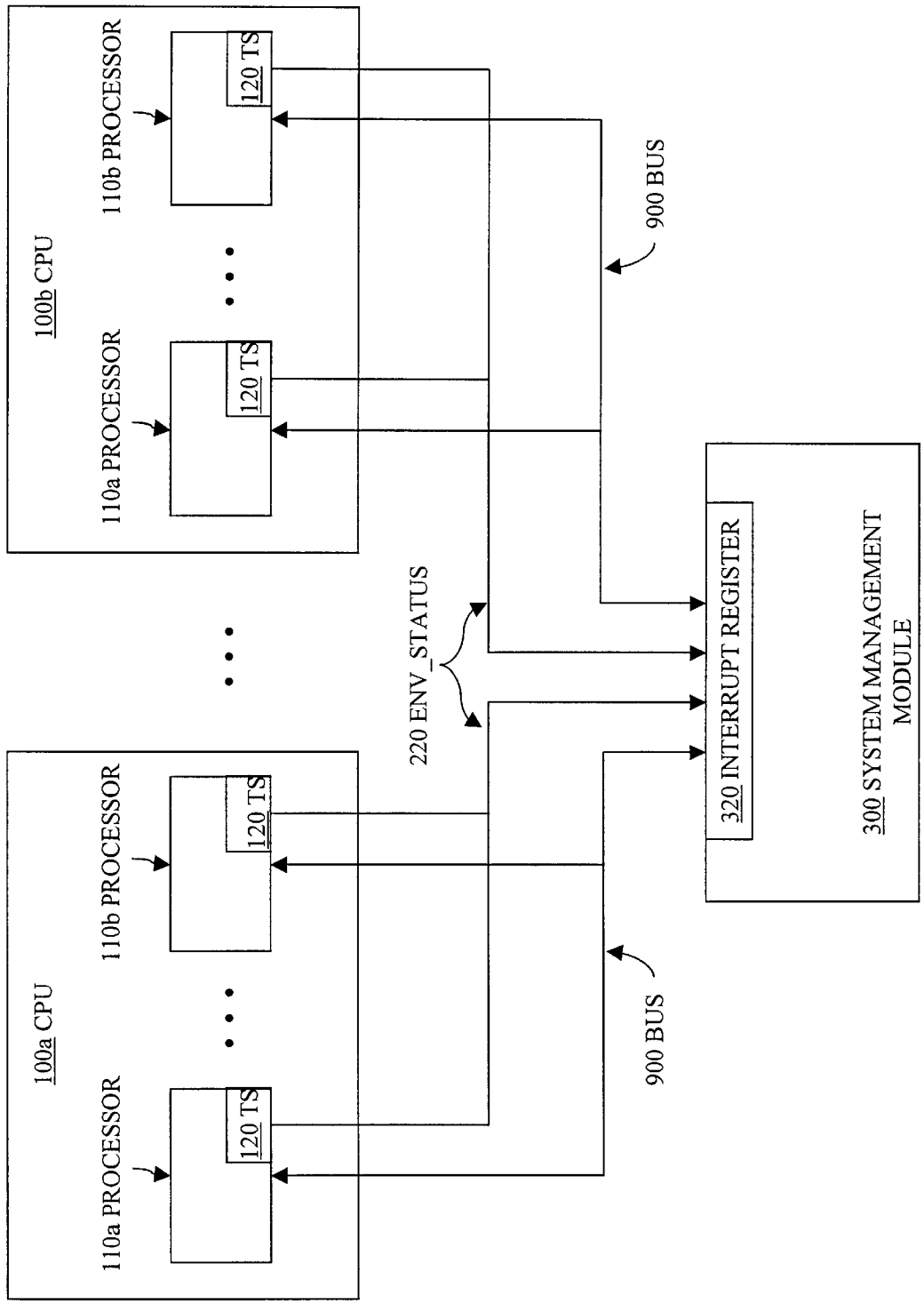
FIG. 3 is a block diagram of an embodiment of a fault-tolerant computer system constructed in accordance with the present invention.

Referring to FIG. 3, in another embodiment, the same CPUs 100 and their processors 110 containing the thermal sensors 120 are in communication with a common external System Management Module (SMM) 300. In this embodiment, the SMM executes a controlled process whereby it repeatedly polls each of the processors 100 to report thermal condition status in ENV_STATUS 220. In response to an over-temperature reported on any processor 110, the SMM 300 communicates with all processors 110 to set a clock-throttle control bit substantially simultaneously within a register in communication with each processor 110. Having the clock-throttle bit set, the processors 110, operating in lock-step, respond by uniformly reducing their clock value by a set amount to a lower rate.

Yet in more detail, in one embodiment shown in FIG. 2, each processor 110 contains a processor unit 430 that executes instructions and a phase-locked loop (PLL) 440 that is used to generate local clock signals from an external system clock 500. An interrupt 230 signal causes each processor 110 to perform an interrupt handler routine designated for that interrupt whereby the contents of the SM 302 interrupt register 320, specifically the "too hot" bit 460, are read by the handler routine. In another embodiment, the SMM 300 polls each processor 110 for its thermal status and sets a clock-throttle bit within a processor 110 register in response to an over-temperature condition. When the contents of the "too hot" bit 460 indicate the existence of a temperature having exceeded a predefined threshold, or alternatively, if the clock throttle bit has been set in a processor 110 register, each processor unit 430 modifies its local clock rate a predefined amount by altering an input control signal (CTRL) 470 to the PLL 440. The PLL 440 is synchronized to an external system clock 500 and generates the processor local clock (LOCAL CLK) 480.

Figure 4:
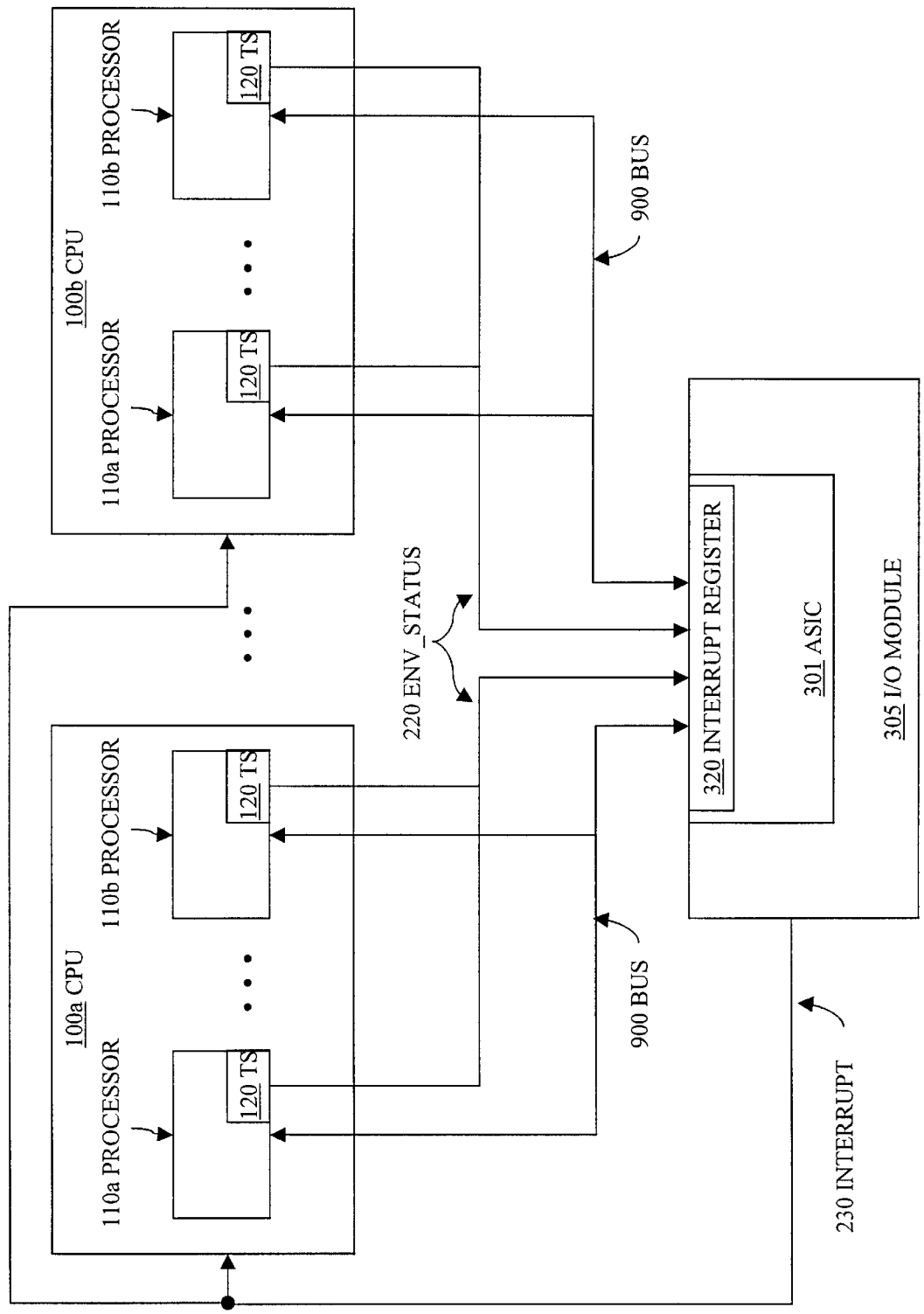
FIG. 4 is a system block diagram of an embodiment of a fault-tolerant computer system constructed in accordance with the present invention.

Referring to FIG. 4, in a preferred embodiment a Fault Tolerant Computer (FTC) system comprises multiple redundant CPUs 100 operating in a synchronized lock-step manner. Each of the CPUs 100 includes multiple independent processors 110. Each processor 110 of a particular CPU 100 operates in combination with the other processors 110 of the same CPU, not necessarily performing the same instructions on the same clock cycles, comprising a symmetric multiprocessing CPU 100. On the redundant CPUs 100, each processor 110 operates in lock step with the respective processors on the other CPUs 100. That is, processor 110a of CPU 100a is operating in lock step with processors 10a of redundant CPU(s) 100b. Through a bus 900, each processor is in communication with a common external Input/Output (I/O) module 305. In this embodiment, the bus 900 is a proprietary bus that functions as a PCI bridge to interconnect PCI busses resident on each CPU 100 and the I/O module 305; however, other communication busses may be used. In one embodiment shown in FIG. 4, the I/O module comprises an Application Specific Integrated Circuit (ASIC) 301, that further comprises an interrupt register 320. The temperature sensor 120 of each processor 110 communicates the results of an over-temperature condition in ENV_STATUS 220 to the ASIC 301 interrupt register 320. The ASIC 301, having been notified of an over-temperature condition on any of the processors 110, generates an interrupt 230 substantially simultaneously to all processors 110. In response to the interrupt 230, the processors 110 halt all then current processes and, maintaining lock-step operation, enter an interrupt service handling routine where the contents of the interrupt register 320 are read to determine the cause of the interrupt.

In one embodiment, all processors 110 of all CPUs 100 respond by reducing their clock rate in a lock-step manner to a reported over-temperature condition from any processor 110. In another embodiment, only respective processors 110 of each redundant CPU 100 respond to an over-temperature condition reported by a corresponding processor. That is, processors 110a of each of CPU 100a and CPU 100b would respond by reducing their operating clock rates in response to an over-temperature condition reported from processor 110a of any CPU 100, while processor 110b would continue to operate at the normal clock rate.

Figure 5:
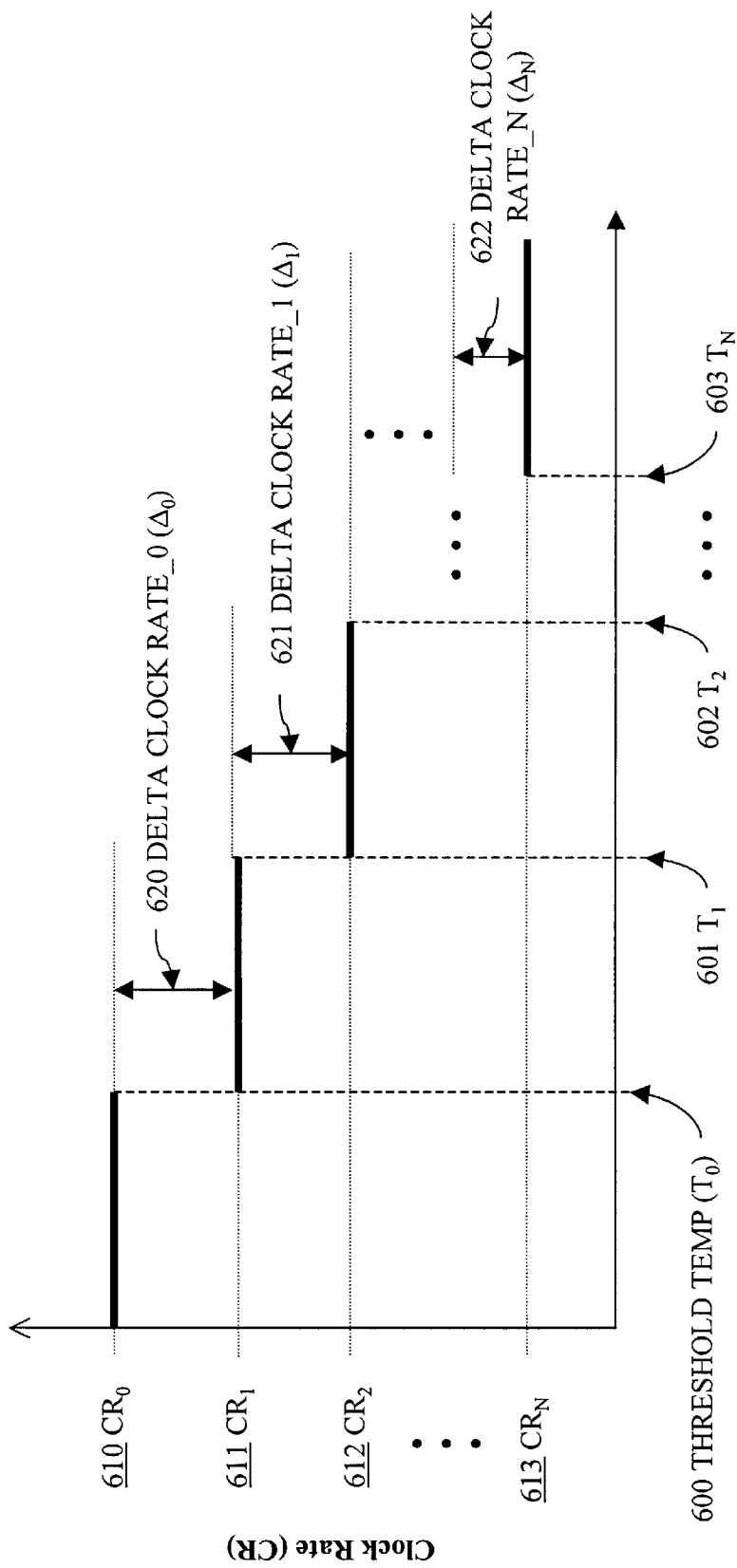
FIG. 5 is a graph the processor clock rate versus temperature.

Referring to FIG. 5, in one embodiment comprising a single temperature threshold, the processor clock rate is shown as a function of on-die temperature. In this embodiment processor 110 runs at its normal clock rate ($CR_0$) 610 for all temperatures below the programmed threshold temperature ($T_0$) 600. As the on-die temperature rises above $T_0$ 600, the processor clock rate is reduced by a set amount, delta clock rate ($\Delta_0$) 620, to a new lower clock rate of $CR_1$ 612. The clock rate remains at this lower rate until the measured on-die temperature falls below $T_0$ 600. When the temperature falls below $T_0$ 600, the processor clock rate increases by the same set amount, $\Delta_0$ 620, returning to the normal processor clock rate, $CR_0$ 610. Also referring to FIG. 5, in another embodiment having multiple threshold temperatures, the relationship between processor clock rate and on-die temperature is shown with multiple threshold temperatures: $T_1$ 601 through $T_N$ 603; multiple clock rates: $CR_2$ 612 through $CR_N$ 613; and multiple delta clock rate values: $\Delta_1$ 621 through $\Delta_N$ 622.

Figure 6:
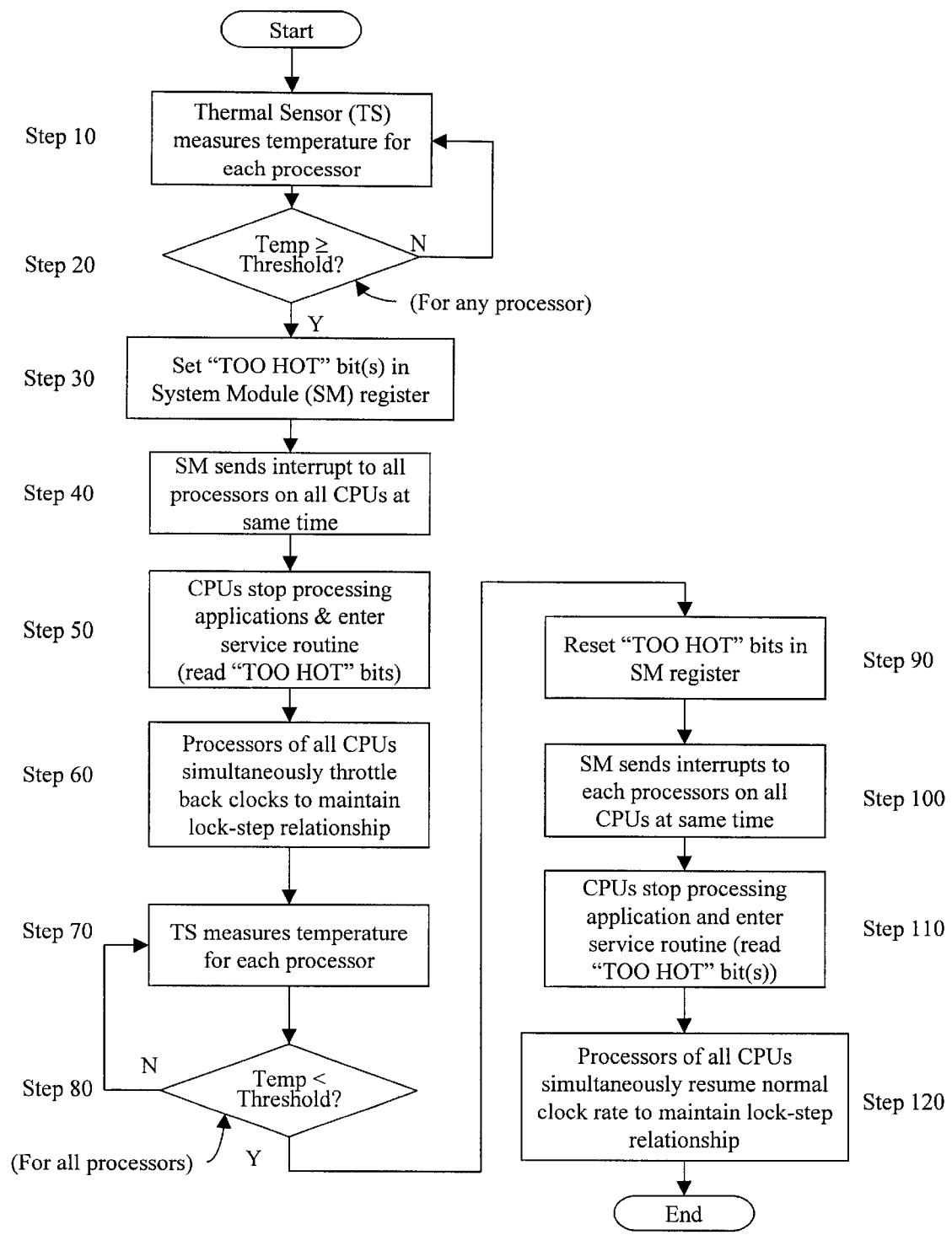
FIG. 6 is a flowchart depicting an interrupt-driven embodiment of the invention.

An embodiment of the processor clock rate modification process in a system of processors having internal temperature monitors is depicted in FIG. 6. After system boot and once the synchronized operation of all primary and redundant CPUs has been attained, the thermal sensor 120 of each processor 110 measures the on-die temperature (step 10). The thermal sensor 120 of each processor 110 compares the measured temperature to the stored threshold value (step 20). The thermal sensor 120 of each processor 110 continues to measure the on-die temperature and compare the measured value to the stored threshold value until the measured value is equal to or greater than the threshold value. Once the measured on-die temperature of any processor 110 has reached or surpassed the threshold value, a value is reported by ENV_STATUS 220 and written and stored within the "too hot" bit(s) 460 of the interrupt register 320 (step 30). After the "too hot" bit(s) 460 has been set, the SM 302 sends an interrupt substantially simultaneously to all processors 110 (step 40). In response to the interrupt, each processor 110, which has been operating in lock step with the other processors, halts processing of all applications and enters an interrupt handling service routine, during which time, the "too hot" bit(s) 460 is read from the interrupt register 320 substantially simultaneously by each processor 110 (step 50). Upon reading the "too hot" bit(s) 460, the processor unit 430 of each processor 110, operating in lock-step with respective processors 110 of redundant CPUs 100, proceeds to reduce its clock rate by a set amount maintaining lock-step relationship by executing the same clock-throttle command on the same clock cycle (step 60).

While operating at the reduced clock rate, the thermal sensor 120 of each processor 110 continues to measure the on-die temperature (step 70) and compare it to the threshold value (step 80). Once the measured temperature of all processors 110 have reduced to values below the threshold value, the results are reported by ENV_STATUS 220 and the "too hot" bit(s) 460 of the interrupt register 320 are reset (step 90). After the "too hot" bit(s) 460 has been reset, the SM 302 sends an interrupt substantially simultaneously to all processors 110 (step 100). In response to the interrupt, each processor 110, which has been operating in lock step with the other processors, halts processing of all applications and enters an interrupt handling service routine, during which time, the "too hot" bit(s) 460 is read from the interrupt register 320 substantially simultaneously by each processor 110 (step 110). Upon reading the "too hot" bit(s) 460, the processor unit 430 of each processor 110 operating in lock step with other processors 110, proceeds to increase its clock rate to resume normal clock rate operation (step 120). In one embodiment, the processor 110 clock resumes its normal rate in a single step. Whereas, in other embodiments, the processor 110 clock gradually resumes its normal rate gradually, in multiple steps.

Figure 7:
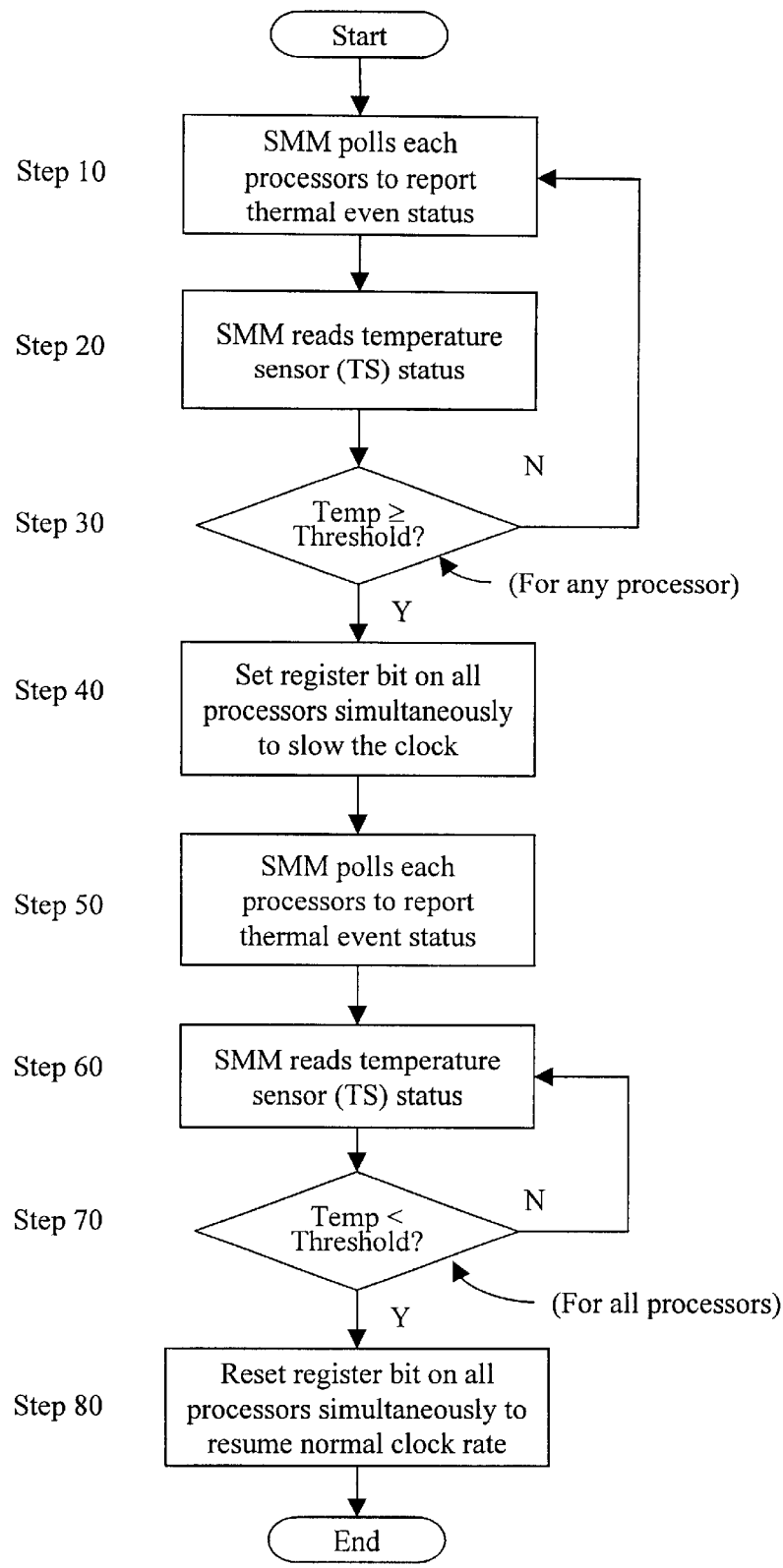
FIG. 7 is a flowchart chart depicting a software-polling embodiment of the invention.

In another embodiment, a processor 110 clock-throttle process is depicted in FIG. 7. After system boot and once synchronized operation of all primary and redundant CPUs 100 has been attained, a common external System Management Module (SMM) 300 polls every processor 110 for the output value of its thermal sensor 120 (step 10). SMM 300 reads the value of ENV_STATUS 220 reported from each processor 110 in response to each poll (step 20) to determine if the measured temperature of any processor 110 is equal to or greater than the threshold value (step 30). The SMM 300 continues to poll each processor 110 until a reported ENV_STATUS 220 indicates that the measured temperature has met or exceeded the threshold value. If ENV_STATUS 220 of any processor 110 indicates an over-temperature condition, the SMM 300 substantially simultaneously sets a corresponding register bit on all processors 110 (step 40). Setting the appropriate processor register bit of each processor 110 in this manner, prompts each processor 110 operating in lock-step relation to other processors, 110 to modify its local processor clock rate to a slower rate, maintaining lock-step relationship by executing the same clock-throttle command on the same clock cycle.

While operating at the reduced clock rate, the SMM 300 continues to poll each processor 110 for the output value of its thermal sensor 120 (step 50). The SMM 300 reads the values of ENV_STATUS 220 reported from each processor 110 in response to each poll (step 60). The SMM 300 examines the resulting ENV_STATUS 220 values to determine if the measured temperatures of all processors 110 are below the threshold value (step 70). Once the measured temperature of all processors 110 have reduced to values below the threshold value, the clock-throttle bit of each processor 110 is reset, prompting each processor to substantially simultaneously increase its clock rate to resume normal clock rate operation (step 80), while maintaining lock-step relationship.

EXAMPLE

The following example is one way of using the invention to control the clock rate in response to an environmental condition within a multi-processor Fault-Tolerant Computer (FTC) system where redundant, multi-processor CPUs 110 are operating in lock step. In this example, an embodiment of the invention is used to control power consumption in relationship to the Time of Day (TOD). Power consumption of a FTC system is reduced by throttling the processor clock rate during certain time periods, such as during hours of peak utility usage, and not reducing power consumption during other time periods.

In this example, the processor 110 includes a register that holds a regularly updated value representing a time-reference, such as the TOD, or "wall-clock" time. Another register is used to store a threshold time(s). The value of the TOD register is regularly compared with the stored threshold value. One or more bits are used for storing the time values in the processor 110 registers depending on the required resolution of the time threshold. For example, a single binary bit would be sufficient to discriminate between a.m. and p.m.; whereas additional bits would allow further resolution of hours, minutes, seconds, etc. When results of the comparison indicate that the processor 110 TOD value has exceeded the stored threshold value, the processor clock rate, LOCAL_CLK 480, is slowed by a predetermined amount.

In this example, the clock rate of LOCAL_CLK 480 is controlled by a PLL 440, shown in FIG. 2, comprising a Voltage Controlled Oscillator (VCO), a divider, and a phase detector. The output of the VCO represents the output of PLL 440, LOCAL_CLK 480. Within the PLL 440, the VCO output is divided by a number, resulting in a lower-frequency, time-varying signal. Within the PLL 440, a phase detector compares the divided signal with the system clock reference and generates a voltage proportional to any phase-offset. Within the PLL 440, the phase-offset signal is input into the VCO to adjust and stabilize the frequency of LOCAL_CLK 480. Thus, the clock rate of LOCAL_CLK 480 is determined by the number used in the divider of PLL 440.

In this example, results of the comparison of the contents of the TOD register to the contents of the time threshold register, provide a numeric value that is input into the divider of the PLL. In one embodiment of the invention, a value of "2" is written into the divider register of the PLL 440, when the threshold is exceeded. This causes the VCO output signal to be divided by "2" and results in a reduction of LOCAL_CLK 480 clock rate by one half. Other embodiments store multiple threshold values, where multiple clock rates are required at different times. This is accomplished by generating different PLL 440 divider numbers depending on which time threshold value(s) have been exceeded and using these numbers to control the clock in a similar manner. The LOCAL_CLK 480 clock rate could be divided by 2 if the TOD has exceeded a first threshold, and divided by 4 if the TOD has exceeded a second threshold, etc.

Having shown the preferred embodiments, one skilled in the art will realize that many variations are possible within the scope and spirit of the claimed invention. It is therefor the intention to limit the invention only by the scope of the claims.

What is claimed is:

1. In a system including a plurality of processors, each processor operating at a respective clock rate, a method for controlling the respective clock rate of each of said plurality of processors in response to an environmental condition of a processor, the method comprising the steps of:
   a) identifying a processor environmental condition;
   b) notifying, substantially simultaneously, each processor of said plurality of processors of the existence of said processor environmental condition; and
   c) modifying said clock rate of each of said plurality of processors in response to said notice of said existence of said processor environmental condition.

2. The method of claim 1 wherein said step of identifying a processor environmental condition further comprises the steps of:
   a) writing said environmental condition reported by said processor to a register; and
   b) reading said environmental condition reported by each of said plurality of processors from said register.

3. The method of claim 1 wherein said notification step further comprises generating an interrupt.

4. The method of claim 1 wherein said step of identifying a processor environmental condition further comprises the steps of:
   a) polling each of said plurality of processors to request said environmental condition;
   b) writing said environmental condition reported by each of said plurality of processors to a register; and
   c) reading said environmental condition reported by each processor of said plurality of processors from said register.

5. The method of claim 1 wherein said environmental condition is temperature.

6. The method of claim 1 wherein said environmental condition is humidity.

7. The method of claim 1 wherein said environmental condition is electrical current.

8. The method of claim 1 wherein said environmental condition is time.

9. The method of claim 1 wherein said environmental condition is barometric pressure.

10. A method for controlling the clock rate of a processor in response to an environmental condition, the method comprising the steps of:
    a) providing a plurality of Central Processing Units (CPU), each of said plurality of CPUs comprises a first processor operating at a first clock rate and a second processor operating at a second clock rate;
    b) identifying an environmental condition associated with a first processor;
    c) notifying, substantially simultaneously, each of said first processors of the existence of said first processor environmental condition; and
    d) modifying said first clock rate in response to said environmental condition notice.

11. The method of claim 10 wherein said step of identifying a processor environmental condition further comprises the steps of:
    a) writing said environmental condition reported by said processor to a register; and
    b) reading said environmental condition reported by each of said plurality of processors from said register.

12. The method of claim 10 wherein said notification step further comprises generating an interrupt.

13. The method of claim 10 wherein said step of identifying a processor environmental condition further comprises the steps of:
    a) polling each of said plurality of processors to request said environmental condition;
    b) writing said environmental condition reported by each of said plurality of processors to a register; and
    c) reading said environmental condition reported by each processor of said plurality of processors from said register.

14. The method of claim 10 wherein said environmental condition is temperature.

15. The method of claim 10 wherein said environmental condition is humidity.

16. The method of claim 10 wherein said environmental condition is electrical current.

17. The method of claim 10 wherein said environmental condition is time.

18. The method of claim 10 wherein said environmental condition is barometric pressure.

19. In a system including a plurality of processors, each processor operating at a respective clock rate, an apparatus for controlling the respective clock rate of each of said plurality of processors in response to an environmental condition of a processor, said apparatus comprising:

a) an environmental condition sensor for sensing a processor environmental condition;

b) a notification device in electrical communication with said environmental sensor for notifying each processor of said plurality of processors of the existence of said processor environmental condition; and c) a clock rate controller in communication with said notification device wherein said clock rate of each of said processors of said plurality of processors is modified in response to said notification of said processor environmental condition.

20. The apparatus of claim 19, wherein the sensing mechanism further comprises a controlled polling of each of said processor of said plurality of processors.

21. The apparatus of claim 19, wherein the notification mechanism further comprises a register for reporting status of said processor environmental condition.

22. The apparatus of claim 21, wherein the notification mechanism further comprises a bus for reporting status of said processor environmental condition.

23. The apparatus of claim 21, wherein the notification mechanism further comprises an interrupt handler.

* * * * *